Feb. 21, 1933.  J. V. SCHAFER  1,898,316
FISHERMAN'S REEL
Filed Jan. 13, 1930    2 Sheets-Sheet 1
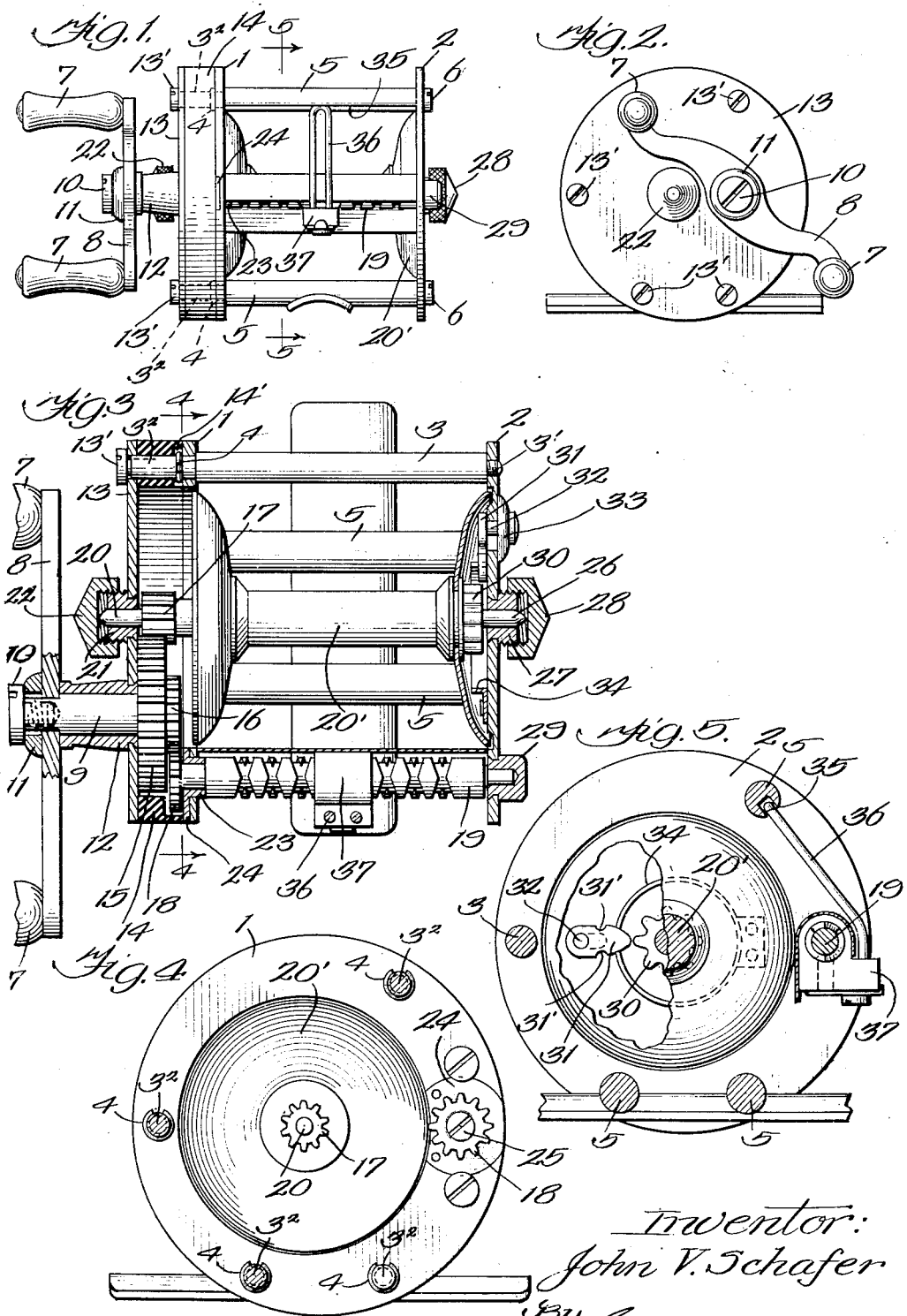
Inventor:
John V. Schafer

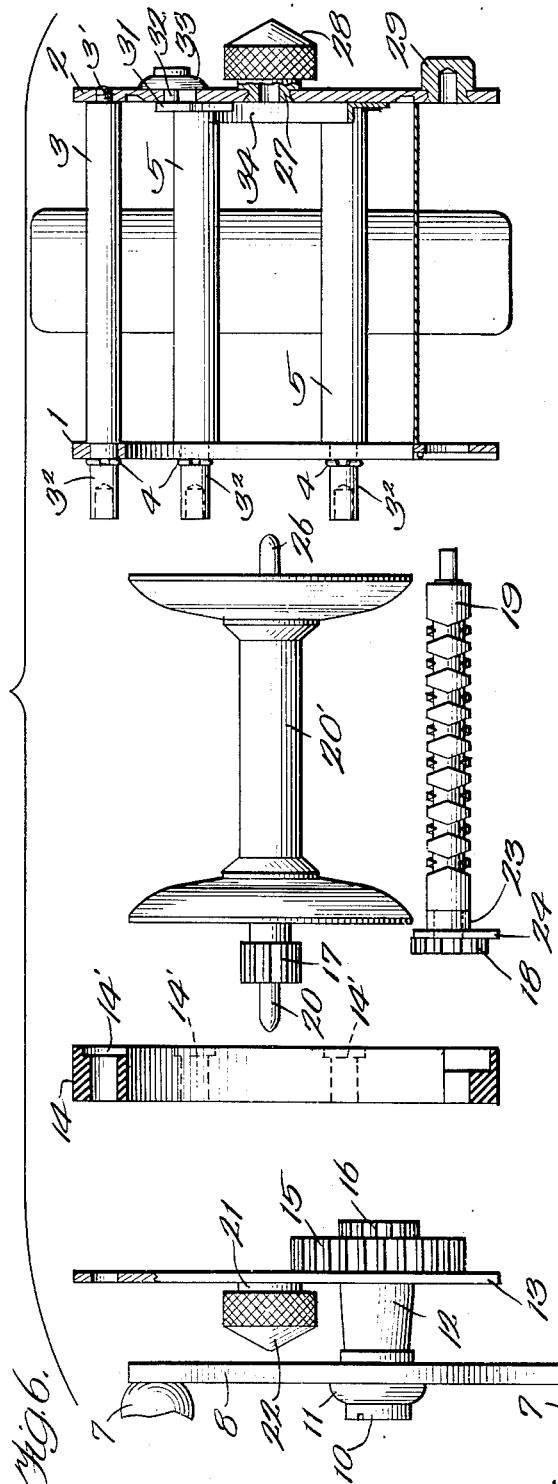

Patented Feb. 21, 1933

1,898,316

UNITED STATES PATENT OFFICE

JOHN V. SCHAFER, OF BRONSON, MICHIGAN, ASSIGNOR TO BRONSON REEL COMPANY, OF BRONSON, MICHIGAN, A CORPORATION OF MICHIGAN

FISHERMAN'S REEL

Application filed January 13, 1930. Serial No. 420,411.

My invention relates to fishermen's reels and has for its object the construction of a reel with groups of parts arranged in units and so assembled that the units may be separated to afford access to the mechanism of the reel without impairing the assembly of the parts that form the units, and making the reassembly of the units very easy.

In carrying out my invention one of the units in the construction of the reel comprises a cage which confines the winding spool and upon an end plate of which one end of the spool is mounted to turn. This plate extends across the contiguous end of the spool and carries a bearing which surrounds a shaft portion upon this spool end and also, desirably, the end thrust bearing adjacent the outer end of this shaft portion. The cage also has an end plate at the other end of the spool, this latter plate being annular to permit the spool to be passed therethrough to journal the spool, at one end, at the aforesaid bearings. The casing is provided with distance preserving rods that have enlarged portions interposed between the aforesaid plates, these rods preferably having reduced continuations that pass snugly through the annular plate to be in supporting relation with a gear carrier forming a part of a casing which encloses gearing that is in actuating relation to the spool and also to a reciprocable line guide that lays the line upon the spool as the spool is being wound. This gearing is desirably inclusive of a pinion which is coaxial with and fixed upon the shaft portion that is provided upon the contiguous end of the spool and which is coaxial with the spool and the previously mentioned shaft portion that is provided at the other end of the spool. This gearing also includes a gear wheel which is journaled upon the gear carrier and within the gear casing and which is in mesh with the aforesaid pinion. The shaft for this gear wheel is journaled within a bearing that is carried by the gear carrier and is upon the exterior of the gear casing, a handle bar being coupled with this shaft and having handles whereby the handle bar, the shaft carrying the bar and the gear wheel may be turned to turn the spool. Another pinion is desirably provided which is coaxial with said gear wheel and which is in mesh with the pinion that is provided upon the removable shaft which serves to reciprocate a guide for shifting the line as the spool is being wound. The carrier also carries a sleeve bearing and an end thrust bearing for the contiguous shaft portion that is provided upon the spool. The gear casing is separably assembled with the reduced continuations of the rods that maintain the fixed relation of the end plates of the cage. When the gear casing is removed a part of the gearing is removed therewith. The winding spool may thereafter be removed together with the pinion thereon, as may also the shaft that shifts the line guide together with the pinion upon the shaft. The cage remains intact in readiness to receive the removed parts that may readily be assembled therewith.

The invention will be more fully explained in connection with the accompanying drawings in which Fig. 1 is a side view of a reel constructed in accordance with the invention; Fig. 2 is an end view thereof; Fig. 3 is a plan view, on a larger scale, with parts shown in section; Fig. 4 is a sectional view on line 4—4 of Fig. 3; Fig. 5 is a sectional view on line 5—5 of Fig. 1 with parts broken away; Fig. 6 is a view illustrating the parts of a reel in separated relation; Fig. 7 illustrates a detail of construction; and Fig. 8 illustrates parts of the cage in separated relation.

The reel has a cage which is inclusive of an annular end plate 1 and an opposite end plate 2. The reel is inclusive of a distance preserving rod 3 having a larger portion interposed between and maintaining the plates in spaced apart relation, this rod having a threaded reduced end 3' which is screwed into the plate 2 and an unthreaded reduced end $3^2$ which is slipped through the annular plate 1, this rod portion having a circumscribing groove close to the outer face of the plate 1 and receiving a split ring 4 which engages the outer face of this plate, whereby the plate is there held in close assembly with said rod. Other rods 5 are similarly formed with extensions like the extensions $3^2$ and suitably received retaining split spring rings like the rings 4 and similarly numbered. These rods 5, instead of being screwed directly into the plate 2, have reduced extensions that are snugly received within openings in this plate and into which extensions the assembling screws 6 are placed. Reel operating handles 7 are provided upon the outer ends of the handle bar 8 which is slipped upon the flattened end of a stub shaft 9 and which is held upon this stub shaft by a screw 10 that passes into the outer end of the shaft and which serves to hold a finishing washer 11 in place. The shaft 9 is journaled within a bearing 12 which is provided upon the gear carrier 13. This gear carrier is preferably in the form of a circular plate which is slipped upon the reduced ends $3^2$ of the various rods 3 and 5 and is secured in place by the screws 13' whose heads abut this plate and whose shanks enter the rod portions $3^2$. The carrier is separately assembled with a distance preserving ring 14 which constitutes, with the carrier, a gear casing within which the gear wheel 15 and the pinion 16 are fixed upon and coaxially with the shaft 9. Within this gear casing a spool operating pinion 17 is also contained, as is also the pinion 18, for operating the line guide shifting shaft 19. The pinion 17 is provided upon a shaft portion 20 which is coaxial with and fixed with respect to the contiguous end of the spool 20'. This shaft portion passes through a bearing 21 which is carried by the gear carrier 13. This shaft surrounding bearing 21 has an end thrust bearing 22 screwed thereupon to receive the thrusts of said shaft portion. The shaft 19 is journaled upon the bearing 23, this bearing being carried upon a small plate 24 of irregular contour, which is received within recesses of corresponding contour that is formed in the gear carrier. The pinion 18 is fixed upon the reduced end of the shaft 19 that is journaled in the bearing 23. A screw 25 is passed through the pinion 18 into the reduced end of the shaft 19, whereby the pinion is maintained in assembly with the shaft and serves to maintain the bearing 23 and plate 24 also in assembly with the shaft.

The other end of the winding spool is provided with a shaft portion 26 which is journaled within a shaft 27, an end thrust bearing 28 for this shaft portion being screwed upon the bearing 27. The parts 26, 27 and 28 being respectively similar to the parts 20, 21 and 22 previously described. The plate 2 also carries a bearing 29 for the reduced contiguous end of the shaft 19. A star wheel 30 is fixed upon the shaft portion 26. A brake finger is provided upon the plate 2, this finger being fixed upon a pin 32 which is shiftable within a radial slot to bring the brake finger into and out of holding relation with the star wheel to hold the reel from rotation. The pin 32 is provided with an operating head 33. A circular split spring 34 is fixed upon the plate 2, at its mid-portion, and has its ends in engagement with the tapered end of the brake finger and receivable into holding engagement with opposite notches 31' in the finger, in accordance with common practice. A groove 35 is formed in one of the distance preserving rods and receives the line guide 36 which is carried by the reciprocable carriage 37 that is in mesh with the shaft 19, in accordance with common practice.

The ends of the spool head are of cup shape and serve to complete the covering of the contiguous gearing and parts that are carried upon the end plate 2 and the gear carrier plate 13. This gearing and these parts thus covered by the spool heads are apt to become clogged with foreign matter. Hitherto these parts were reached by removing the annular end plate 1 of the cage which resulted in such a disassembly of the parts comprising the reel as to make the reassembly thereof very difficult.

In the structure of my invention the annular end plate 1 is simply assembled with the distance preserving rods by the split spring rings 4' or other simple means which need not be disturbed. When the assembling screws 13' are removed, the gear carrier 13, the gear wheel 15, the pinion 16, shaft 9, bearing 12, handle bar 8 with the handles thereon, the sleeve bearing 21 and the end thrust bearing 22 are removed as a unitary structure. The ring 14 constitutes a gear cage with said carrier which may be separable from the carrier and be disassembled when the carrier is removed, this ring being merely clamped between the carrier and the annular plate 1. The ring is provided with recesses 14' which receive the retaining split spring rings 4. After the gear carrier and the parts in one unitary structure therewith are removed and the ring 14 is also removed, the unitary structure comprising the spool, the pinion 17, the shaft portions 20 and 26 and the star brake wheel 30, may be withdrawn from the annular end plate. The unitary structure comprising the pinion 18, the shaft 19, the bearing 23 and the bearing positioner 24 may also be removed. The parts remaining in assembly with the reel cage and the structures removed from the cage may now readily be individually examined and cleaned as will be readily apparent. After the purpose of the disassembly has been accomplished, the parts are reassembled, an operation which is very rapidly and readily accomplished as will be readily seen.

Changes may be made without departing from the invention.

Having thus described my invention, I claim:

1. A reel structure including, in combination, end plates, one of said plates being annular; distance preserving rods interposed between the end plates, said rods having continuations extending through and continued beyond the annular end plate, said continuations being formed with grooves upon the outer side of the annular end plate; split spring rings received in said grooves and having engagement with the outer face of the annular end plate to maintain the said plate in assembly with the distance preserving rods; a gear carrier; and assembling screw screwed into engagement with said rod continuations and serving to assemble the gear carrier with said annular end plate.

2. A reel structure inclusive of a cage having end plates and distance preserving rods interposed between and having continuations extending through the end plates, one of these end plates being annular, these elements being assembled to constitute a unit; means for securing the rods to the end plate that is not annular; grooves in said continuations on the outer side of the annular end plate; split rings in said grooves; a spool insertable within the cage and withdrawable therefrom through the opening in the annular end plate; a bearing for one end of the spool provided upon the other end plate; a gear casing removably assembled with the cage at the end adjacent the annular end plate, said gear casing including a ring abutting the annular end plate and recessed to receive the split rings; means for securing said gear casing to said rod continuations; and a bearing in the gear casing for the other end of the spool.

In witness whereof, I hereunto subscribe my name.

JOHN V. SCHAFER.